Dec. 1, 1942.　　　　A. ZEITLIN　　　　2,303,596
SHEET THICKNESS GAUGE FOR CONTINUOUS ROLLING MILLS
Filed April 18, 1941　　　5 Sheets-Sheet 2

INVENTOR
ALEXANDER ZEITLIN
BY
Joseph H. Lipschutz
ATTORNEY

Dec. 1, 1942. A. ZEITLIN 2,303,596
SHEET THICKNESS GAUGE FOR CONTINUOUS ROLLING MILLS
Filed April 18, 1941 5 Sheets-Sheet 3

INVENTOR
ALEXANDER ZEITLIN
BY
*Joseph H. Lipschutz*
ATTORNEY

Dec. 1, 1942.  A. ZEITLIN  2,303,596
SHEET THICKNESS GAUGE FOR CONTINUOUS ROLLING MILLS
Filed April 18, 1941  5 Sheets-Sheet 4

FIG. 6.

INVENTOR
ALEXANDER ZEITLIN
BY
Joseph H. Lipschutz
ATTORNEY

Patented Dec. 1, 1942

2,303,596

UNITED STATES PATENT OFFICE 2,303,596

SHEET THICKNESS GAUGE FOR CONTINUOUS ROLLING MILLS

Alexander Zeitlin, New York, N. Y., assignor, by mesne assignments, to Sperry Products, Inc., a corporation of New York Application April 18, 1941, Serial No. 389,194

12 Claims. (Cl. 265—1)

This invention relates to an auxiliary instrument adapted to be employed in connection with the pressure gauge which is now utilized for the purpose of indicating strain in the mill stands of a continuous rolling mill. One such pressure gauge is disclosed in the copending application of Alexander Shayne and Alexander Zeitlin, Serial No. 384,212, filed March 19, 1941, for Strain gauge for rolling mills and the like, and is based upon the principle that when the strip of material passes through the rollers of a mill stand it causes elongation of the mill stand frame and said elongation is a function of the pressure existing between the rolls and therefore of the pressure which is applied to the material.

In continuous rolling mills there is provided a series of mill stands, usually ten in number (in a hot strip mill), and the material, beginning as a thick slab of about 4" thick, is sent through successive mills, each of which applies great pressure on the order of several million pounds to reduce the slab in thickness and to cause it to elongate. When finally the strip passes out of the last mill stand it is a thin sheet of perhaps a thousand feet in length. One of the problems which such continuous rolling presents is to obtain the desired thickness of sheet. Since the thickness is a function of the pressure, an accurate instrument for obtaining a reading of pressures existing between the rolls, such as provided by Shayne and Zeitlin cited above, is of great help in controlling the said thickness. An instrument has been proposed in a copending application of Alexander Shayne, Ser. No. 389,195, filed April 18, 1941, for Sheet thickness gauge for continuous rolling mill, which would make it possible for an operator to tell whether or not the thickness of material being rolled is equal to, less or greater than a predetermined thickness. The instrument disclosed in the said Shayne application did not, however, provide means which would enable an operator to read directly and continuously the actual thickness of the strip being rolled in the particular mill stand. There are several reasons which account for the difficulty in devising such an instrument which will give a continuous indication of thickness of material being rolled. One of these is that whereas the early mill stands in the series of ten have their pressure rolls separated, this separation is diminished in successive stands until finally in the last several stands not only are the pressure rolls not separated, but they are under initial preload pressure. The passage of material through said preloaded rolls adds a further increment in pressure. Since the thickness is a function of both the preload and the increment of pressure, it will be apparent that it is difficult to devise an instrument which will take all of these factors into consideration and permit direct, continuous reading of the thickness of the strip being rolled.

A further difficulty arises, however, from the fact that although the thickness of material passing through the mill stand is a function of the pressure between the rolls, this function is not a straight line function because equal increments of pressure between the rolls do not yield equal increments of elongation of the mill stand and therefore do not yield equal variations in the thickness of material. This is particularly the case in the last several mill stands, which are preloaded. The same increment of pressure will yield different thicknesses of material, depending upon whether the pressure rolls prior to entry of the material therebetween are separated, just touch, or are under pre-load pressure.

It is the principal object of this invention to provide a thickness gauge which will at all times and under all operating conditions give a direct continuous indication to the operator of the actual thickness of the material being rolled in the respective mill stand.

Further objects and advantages of this invention will become apparent in the following detailed description thereof.

In the accompanying drawings.

Figure 1:
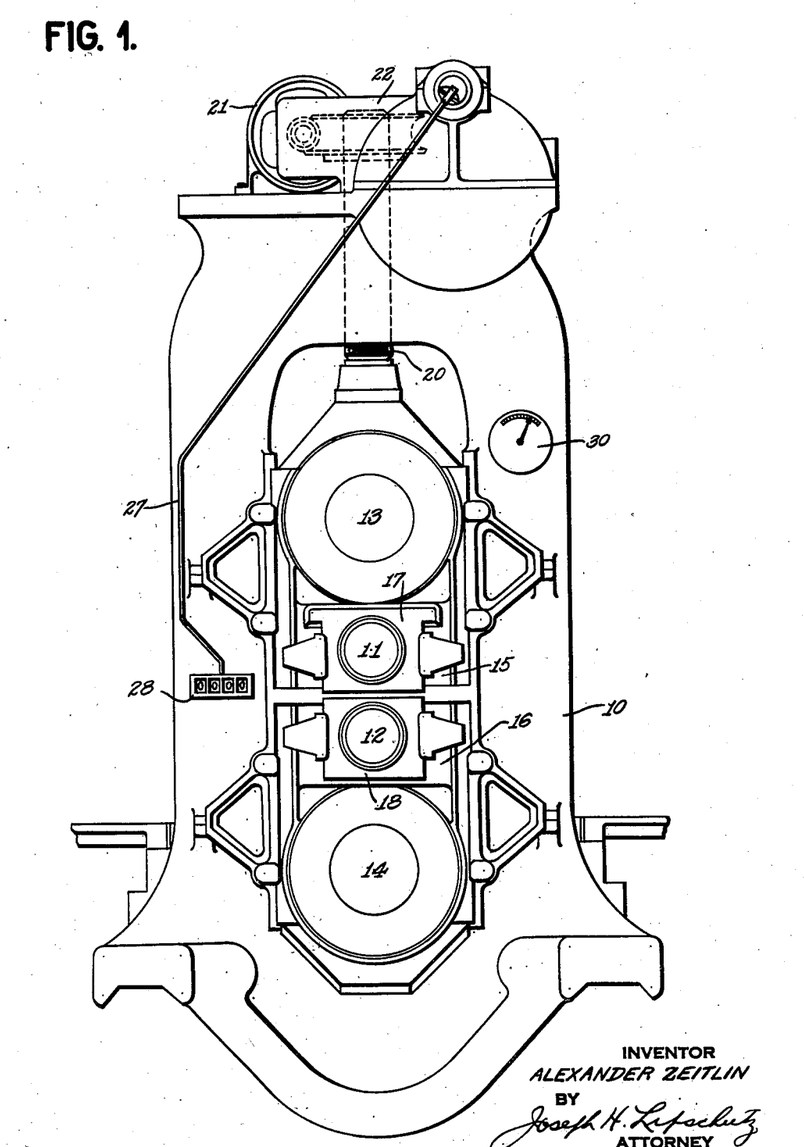
Fig. 1 is an end view of one mill stand showing the invention applied thereto.

Referring to Fig. 1, there is shown one end frame member 10 of a rolling mill stand, which may be one in a series of ten such stands comprising a continuous rolling mill. A similar frame is spaced back of the frame 10 shown, and between said frames there are mounted the rolls of the mill. The mill may be of the four-high type consisting of two pressure rolls 11 and 12 and two back-up rolls 13 and 14. The back-up rolls are mounted in suitable bearing blocks 15 and 16 slideable in the frame, and within these blocks there are slideably mounted other blocks 17 and 18 in which the pressure rolls 11 and 12 are supported. Pressure between the pressure rolls is transmitted by way of the back-up rolls by the application of pressure to block 15 by means such as a screw 20 which engages said block and is actuated from a screw-down motor 21 through suitable gearing contained in housing 22.

Figures 2, 8:
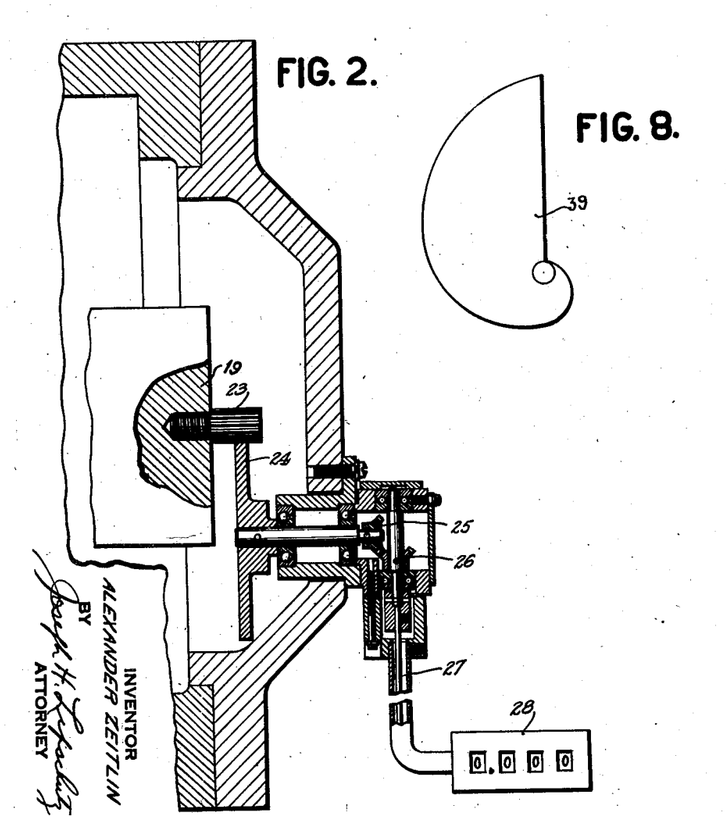
Fig. 2 is a vertical section of an enlarged detail showing the driving mechanism from the screw-down motor to the preload indicator.
Fig. 8 is an enlarged view of a cam employed in the Figs. 4, 6 and 7 forms of the invention.

As the screw-down motor operates it is designed to drive a shaft 19 by way of suitable gearing (not shown). A gear 23 is fixed in shaft 19 concentric therewith and drives by gearing 24, 25, 26, (see Fig. 2) a flexible shaft 27 which is designed to drive a counter 28. The counter is so adjusted that when the pressure rolls 11 and 12 just touch, the counter reads zero. Increasing pressure, causing preload between the rolls, will cause the counter to operate in a direction to indicate plus figures upwards from zero, each of the units to the right of the decimal point indicating vertical movement of the screw and therefore elongation of the mill stand frame of 1/1000 inch. If the screw-down motor is operated in the reverse direction to separate the pressure rolls, then the counter is operated in the reverse direction to indicate 9.999 and downwardly from this figure, each unit representing a roll separation of 1/1000 inch.

As shown in Fig. 1, a pressure gauge 30 is mounted on the frame 10 with a responsive element designed to respond to elongation of the frame caused by pressure between the rolls. The pressure gauge may be of the type disclosed in said application of Shayne and Zeitlin and is provided with means for compensating for preload pressures so that in spite of preload pressure the indicator continues to indicate zero. This is accomplished by causing a compensating mechanism to operate during the intervals when no material is being rolled so as to take out any indication of pressure. It is only the increment in elongation caused by the passage of material between the rolls which this pressure gauge is adapted to indicate. As heretofore explained, in the series of ten mill stands the early stands have the pressure rolls spaced considerably far apart and this spacing is gradually reduced until the rolls just touch, and in the last several stands these rolls are actually under preload pressure from the screw-down motor. As the material passes between the rolls in each case, it tends to spread the rolls apart by a distance equal to the thickness of the material which passes through the rolls. Thus, for example, if the rolls of a mill stand are separated .100" and the material passing between the rolls spreads them another .050", then the thickness of material passing through this stand is .150". In a case where the rolls just touch and the material spreads the rolls .050", then the thickness of material passing through this stand is .050". This is true also in the case of preloaded mills. Let us assume that in the case where the rolls just touch and the sheet is rolled .050", the pressure indicated by the pressure gauge is 1,000,000 pounds. In the next mill stand where the rolls are under preload pressure it is found that in order to roll a sheet .050" considerably more than a million pounds pressure must be exerted, and the further the preloading is increased the more pressure must be generated to accomplish the same increment of elongation of the mill stand.

Figure 3:
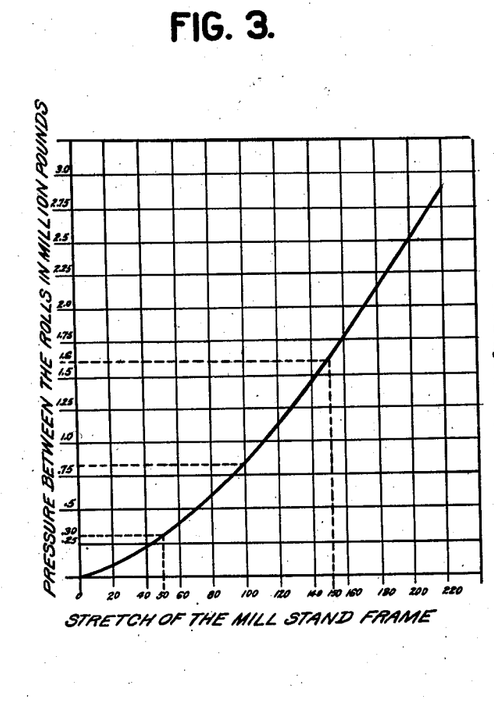
Fig. 3 is a graph showing the mill housing elongation plotted against load or pressure between the rolls.

Thus, referring to the graph of Fig. 3, it will be seen that the relative elongation of the mill stand frame is plotted against the pressure which is applied between the rolls. Beginning at point zero when the rolls just touch and increasing the pressure between the rolls, it will be seen that initially relatively large elongation of the frame is obtained in response to relatively small pressure load application between the rolls. Thus, for instance, when the rolls just touch, the application of approximately 300,000 pounds pressure will cause a frame elongation of .050". To obtain the next .050" of elongation of the frame, that is, from .050" to .100", requires approximately 500,000 additional pounds pressure. It will thus be seen that equal increments of load between the rolls yield progressively less increments of frame elongation; or, stated conversely, to obtain equal increments of frame elongation requires progressively greater application of load between the rolls as the elongation increases. The plot of load against frame elongation results in an exponential curve and is not a straight line.

As hereinbefore stated, a pressure indicator of the type shown in the Shayne and Zeitlin application operates upon the principle of responding to elongation of the frame, and the above discussion makes clear why such elongation cannot be translated directly in terms of thickness. The amount of additional pressure which must be exerted between the rolls to effect the desired thickness of the material (and, hence, elongation of the frame) depends upon the amount of preload between the rolls, that is to say, the position on the exponential curve of Fig. 3 where the pressure increment takes place. Thus, if an additional increment of .050" is desired when the rolls just touch, the curve of Fig. 3 shows us that approximately 300,000 pounds additional pressure will be generated by the sheet passing through the rolls. If, however, there is a .050" preload, then an additional .050" stretch of the mill frame stand will generate 500,000 pounds pressure increment; and, further, if there is .100" preload, an additional .050" stretch of the frame will generate 800,000 pounds additional pressure. It is quite apparent, therefore, that a pressure indicator calibrated in terms of pounds of pressure cannot be translated directly into thickness of material being rolled unless it is known in which part of the curve of Fig. 3 the additional increment is taken. One would have to refer to a chart like that of Fig. 3 to know how much pressure should be indicated by the pressure indicator in order to yield an increment of frame elongation equal to the desired thickness.

The above gives the reasons for the problem inherent in devising an indicator which will read directly the thickness of material passing through the mill stand regardless of the amount of preloading of the mill stand and which may be operated directly from the pressure indicator which is calibrated in terms of pounds. One solution of the problem is disclosed in Fig. 4. Here it will be seen that pressure responsive element 30 operates the pressure indicator dial 31 through any suitable mechanism such as gearing 32, 33 to indicate in thousands of pounds the pressure existing between the rolls. The scale on this dial is, of course, a linear scale wherein equal increments of pressure in pounds occupy equal increments of angular displacement on the indicator dial. Adapted to operate from the pressure indicator is a thickness indicator 40 which may be driven from the pressure responsive element through gears 32, 33, a clutch 36, disc wheel 37, flexible band 38, cam 39, and clutch 41. The band 38 is connected at one end to the periphery of wheel 37 which moves integrally with the pressure indicator dial 31, and said band is connected at its other end to the periphery of a cam 39 which is designed in accordance with the plot of Fig. 3 which shows that equal increments of angular movement of the pressure indicator dial will yield progressively smaller increments of angular movement of the thickness dial 40. Thus it will be seen that as the pressure indicator operates, the thickness dial is also operated but at a progressively lesser rate, so that it requires greater increments of pressure to accomplish equal increments of angular movement of the thickness dial, in accordance with the graph of Fig. 3.

Figure 4:
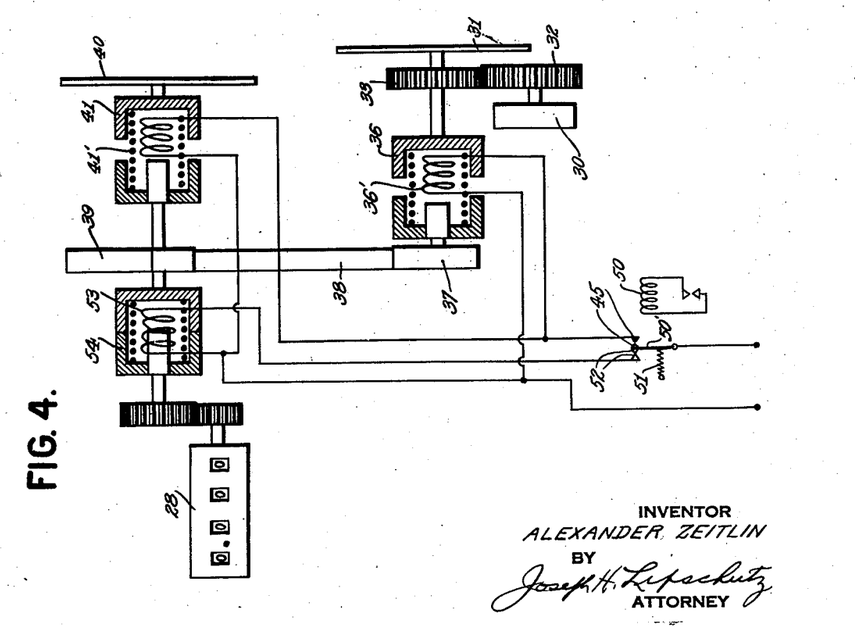
Fig. 4 is a view largely diagrammatic showing one assembly of parts embodying one form of this invention.

If the pressure rolls just contact before the material passes through the mill stand, then pressure indicator dial 31 and the thickness dial 40 will both start from zero and the thickness gauge will read directly the thickness of material passing through the mill stand. If, however, the mill stand is preloaded, then the increment of pressure takes place at a different point in the curve shown in Fig. 3, in other words, in a different angular position of the cam 39 such that it will require greater increments of pressure to achieve the same angular increments of movement of cam 39. For this purpose I have shown the drive from the pressure-responsive element 30 to the pressure indicator dial 31 and to the thickness dial 40 as extending through electromagnetic clutches 36 and 41. The coils 36' and 41' of said clutches are in a circuit which is normally open at contacts 45 when no material is passing through the mill stand. When material is passing through the mill stand a scale breaker is in operation at one of the mill stands, such as mill stand No. 5, for spraying water upon the material in order to prevent the formation of scale. The scale breaker is set in operation when the material reaches mill stand No. 5 by causing the material to close the circuit of a relay coil 50 which then energizes the scale breaker water supply. When material has passed through the mill so as to close scale breaker relay 50, armature 50' is attracted and contacts 45 are closed. This energizes coils 36' and 41' so that thereafter pressure responsive element 30 can drive dials 31 and 40. However, when no material is passing through the mill stand and the scale breaker relay is deenergized, a spring 51 attracts armature 50' and closes the circuit at 52 to deenergize the electromagnets 36' and 41' and energize a relay coil 53 to close a relay clutch 54 between the counter 28 and the cam 39. During the operation of the screw-down motor for preloading, the counter will indicate the number of thousandths of an inch of frame elongation caused by the preload and at the same time cam 39 will be turned to a position corresponding to the preload on the curve of Fig. 3. Thus, for instance, if .050" preload has been indicated on the counter, the cam 39 has been turned to a position corresponding to the .050 elongation on the graph. This means that a further elongation of the frame of .050" will require not 300,000 pounds but 500,000 pounds. Thus the new position of cam 39 takes care of this preload for it has been moved into a position where it will require larger angular increments of rotation of ring 37 and hence of the pressure indicator dial 31 to yield the same increment of elongation as indicated on the thickness gauge. When the preload has been completed and the material starts moving through the mill, relay coil 50 is energized to close contacts 45, open the circuit at 52 to deenergize clutch 54 and close the circuit at 45 to energize clutches 36 and 41. The energization of clutches 36 and 41 occurs now with the cam 39 set in its new position corresponding to the preload. The additional increment of pressure driving through the cam 39 will yield a direct increment of thickness on the thickness gauge 40 and the said thickness can then be read directly because despite the new position of cam 39, dial 40 has not been rotated from its zero position during preloading since clutch 41 was deenergized. The thickness gauge 40 is also a linear scale since the exponential relationship between dial 31 and dial 40 has been translated in the connection between linear ring 37 and cam 39.

Figure 5:
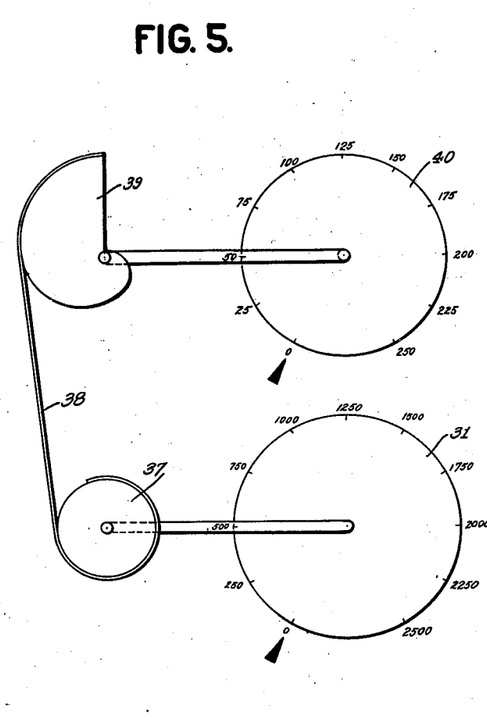
Fig. 5 is a development of parts of Fig. 4.

While the device disclosed in Figs. 4 and 5 yields a direct reading thickness gauge operated from the pressure indicator and calibrated in terms of pounds which is applicable in every case ranging from the one in which the rolls just touch to the cases where the rolls are under progressively increasing preload pressure, it is still the case that in those mill stands where the rolls are initially separated the thickness gauge 40 would not indicate directly the total thickness of the sheet. This is true because in addition to the increment of elongation of the frame caused by the material passing through the rolls, the thickness of said material also includes the amount by which the pressure rolls were originally spaced apart. It will be understood that not every mill stand is provided with a thickness gauge, and in many mills it is not desired to check the thickness until the strip is passing through the final mill stands. In such cases the device disclosed in Figs. 4 and 5 would be ample because there is no roll separation in such stands. However, in order that the thickness gauge may indicate the thickness of material passing through the mill stand directly in every case, whether the rolls are separated, just touch, or are under preload pressure, the form of invention disclosed in Fig. 6 may be employed. In this form of the invention, also, the pressure responsive element 30 drives the pressure indicator dial 31 and the thickness indicator dial 40 through electromagnetic clutches 36 and 41 whose coils 36' and 41' are adapted to be energized when the circuit through the scale breaker relay 50 is closed. If the screw-down motor is operated in the reverse direction so as to separate the pressure rolls, the counter 28 is operated in a direction so as to bring the numerals 9.999, etc. into view. As soon as the most extreme left-hand zero moves away from its original position (which means as soon as there is any roll separation) a set of contacts 70, which is normally closed when the extreme left-hand zero of the counter is in view, is opened to deenergize a coil 71 and thus permit a spring 72 to open contacts 73 and close contacts 74. Closing contacts 74 energizes a relay 75 of an electromagnetic clutch 76 so that the rotation of the screw-down motor in separating the rolls will drive the thickness dial 40 from shaft 77 through gearing 78, 79, the clutch 76, gearing 80, 81, 82. Since the scale breaker relay 50 is not energized at this time, clutches 41 and 36 are open, and since contacts 73 are open when the rolls are separated, coil 53 is deenergized and clutch 54 is open so that cam 39 and wheel 37 are not actuated. The thickness dial 40 will now be set to a point corresponding to the separation of the rolls and therefore, instead of the dial starting at zero when the material passes through the mill stand, it will start from a point corresponding to the degree of separation of the rolls. Thus, if the rolls have been separated .025", then the point 25 on dial 40 will be opposite the index instead of zero, and the additional elongation caused by the passage of material through the mill stand will be added to this initial indication of .025".

Figure 6:
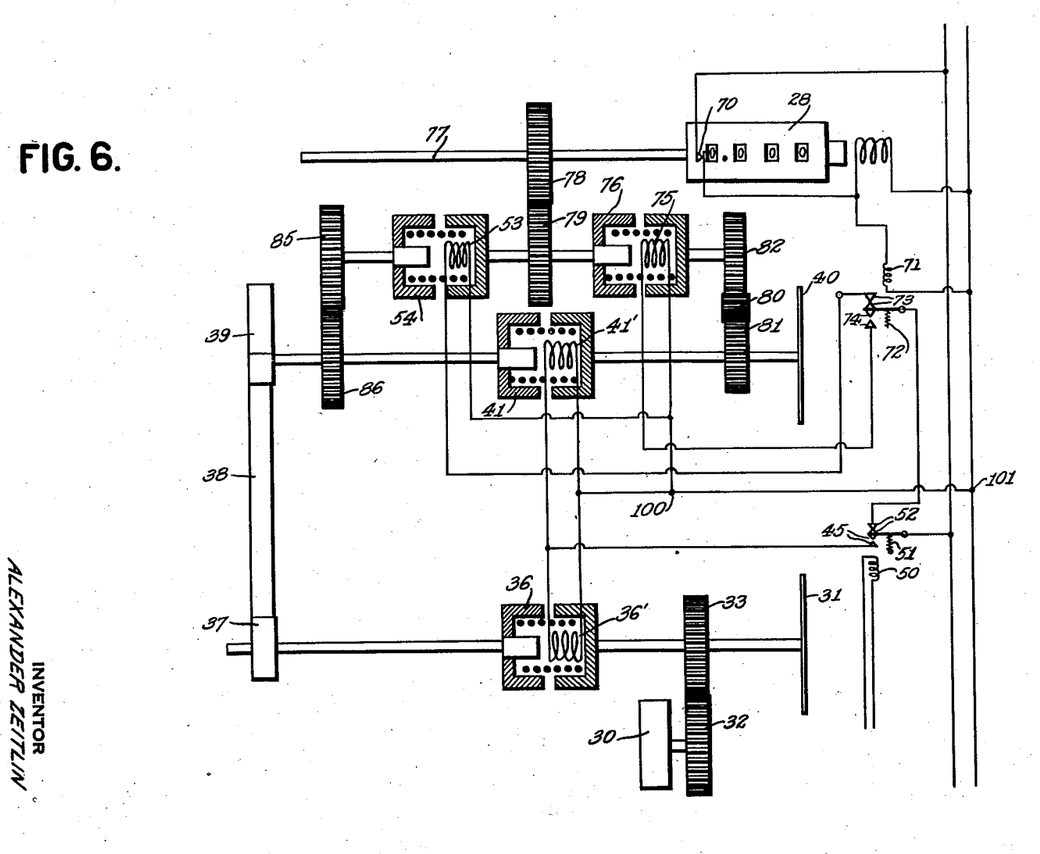
Fig. 6 is a view similar to Fig. 4 showing another form of the invention.

In the Fig. 6 form, as soon as material starts moving through the mill stands and the scale breaker relay 50 is energized, contacts 45 are closed while contacts 52 are opened, and the closing of contacts 45 energizes coils 36' and 41' to close clutches 36 and 41. Opening of contacts 52 deenergizes coil 75. The pressure responsive element 30 can now drive through wheel 37, flexible band 38 and cam 39 to the dial 40 by way of clutch 41.

If instead of roll separation in the Fig. 6 form there is preload, then the device operates in a manner similar to the Fig. 4 form. In this case, contacts 70 remain closed and therefore coil 71 is energized to close the circuit at 73 and energize coil 53 to close the clutch 54. Preloading then will cause the cam 39 to be set to a new position (by way of shaft 77, gears 78, 79, clutch 54, gears 85, 86) without, however, operating dial 40 because clutch 41 is open by reason of the fact that no material is passing through the mill stand during the preloading and the scale breaker relay has not been energized. When relay 50 is energized the circuit through coil 53 is broken when contacts 52 are opened.

Figure 7:
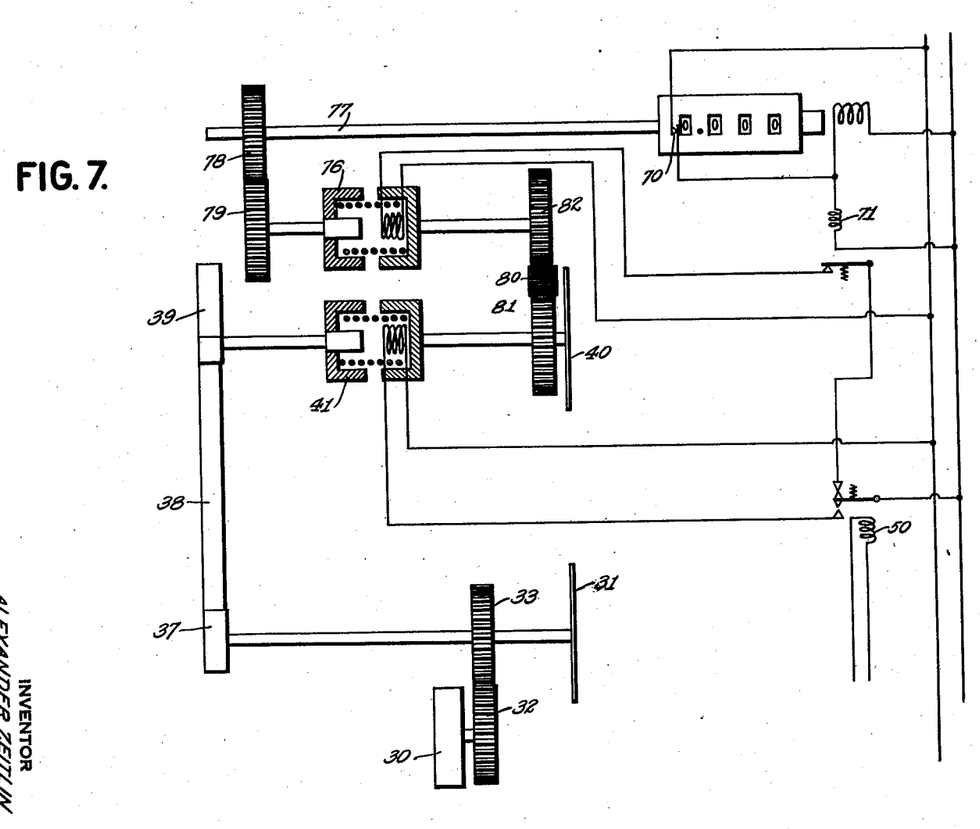
Fig. 7 is a view similar to Figs. 4 and 6 showing still another form of the invention.

The Fig. 7 form is a simplification because it is based upon a type of pressure indicator which does show the preload. In other words, there is no compensating means which acts when no material is passing through the mill stand to return the pressure indicator to zero in spite of the fact that the rolls are preloaded. In this type of pressure indicator, preloading would actuate the pressure indicator which would stay at the preload indication and any further loading would be over and above the preload; in other words, the total load due to the preload and pressure created by the material passing between the rolls would be indicated. In this form of the invention, therefore, any pressure response of the pressure responsive element 30 would operate on the indicator 31 as before and would carry the disc 37, band 38 and cam 39 therewith to the new setting (because clutch 36 is omitted). The thickness indicator would not be affected by the preloading because the clutch 41 would be deenergized during this interval, as hereinbefore described. The thickness gauge would, however, show total thickness including the roll separation in the same manner as Fig. 6, because there is provided a similar clutch 76 controlled from the set of contacts 70 so that when the rolls are separated this clutch becomes effective so that the drive from the screw-down motor by way of 77, 78, 79 drives the thickness dial 40 through the clutch 76 and gearing 80, 81, 82.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a continuous rolling mill stand comprising a frame and rolls mounted in said frame, the load between said rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, and a connection between said indicators whereby equal increments of movement of the pressure indicator yield progressively smaller increments of movement the thickness indicator.

2. In a continuous rolling mill stand comprising a frame and rolls mounted in said frame, the load between said rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, and a driving connection between said indicators including a cam adapted to be actuated through progressively smaller angular increments in response to equal angular increments of the pressure indicator.

3. In a continuous rolling mill stand comprising a frame, rolls mounted in said frame and means for moving said rolls relatively to effect preloading or separation, the load between the rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, a connection between said indicators whereby equal increments of movement of the pressure indicator yield progressively smaller increments of movement of the thickness indicator, and means rendered effective when said roll-moving means is actuated to preload the rolls, when no material is passing through the mill, for actuating said connection and for disconnecting both of said indicators from said connection during the preloading operation.

4. In a continuous rolling mill stand comprising a frame, rolls mounted in said frame and means for moving said rolls relatively to effect preloading or separation, the load between the rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, a connection between said indicators whereby equal increments of movement of the pressure indicator yield progressively smaller increments of movement of the thickness indicator, means rendered effective when said roll-moving means is actuated to preload the rolls, when no material is passing through the mill, for actuating said connection and for disconnecting both of said indicators from said connection during the preloading operation, and means whereby the passage of material through the mill renders said preceding means ineffective and connects said indicators to said connection.

5. In a continuous rolling mill stand comprising a frame, rolls mounted in said frame and means for moving said rolls relatively to effect pre-loading or separation, the load between the rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, a connection between said indicators whereby equal increments of movement of the pressure indicator yield progressively smaller increments of movement of the thickness indicator, and means rendered effective when said roll-moving means is actuated to separate the rolls, when no material is passing through the mill, for actuating said thickness indicator and for disconnecting both of said indicators from said connection.

6. In a continuous rolling mill stand comprising a frame, rolls mounted in said frame and means for moving said rolls relatively to effect pre-loading or separation, the load between the rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, a connection between said indicators whereby equal increments of movement of the pressure indicator yield progressively smaller increments of movement of the thickness indicator, means rendered effective when said roll-moving means is actuated to separate the rolls, when no material is passing through the mill, for actuating said thickness indicator and for disconnecting both of said indicators from said connection, and means whereby the passage of material through the mill renders said preceding means ineffective and connects said indicators to said connection.

7. In a continuous rolling mill stand comprising a frame, rolls mounted in said frame and means for moving said rolls relatively to effect preloading or separation, the load between the rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, a connection between said indicators whereby equal increments of movement of the pressure indicator yield progressively smaller increments of movement of the thickness indicator, means rendered effective when said roll-moving means is actuated to preload the rolls, when no material is passing through the mill, for actuating said connection and for disconnecting both of said indicators from said connection during the preloading operation, and means rendered effective when said roll-moving means is actuated to separate the rolls, when no material is passing through the mill, for actuating said thickness indicator and for disconnecting both of said indicators from said connection.

8. In a continuous rolling mill stand comprising a frame, rolls mounted in said frame and means for moving said rolls relatively to effect preloading or separation, the load between the rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, a connection between said indicators whereby equal increments of movement of the pressure indicator yield progressively smaller increments of movement of the thickness indicator, means rendered effective when said roll-moving means is actuated to preload the rolls, when no material is passing through the mill, for actuating said connection and for disconnecting both of said indicators from said connection during the preloading operation, means rendered effective when said roll-moving means is actuated to separate the rolls, when no material is passing through the mill, for actuating said thickness indicator and for disconnecting both of said indicators from said connection, and means whereby the passage of material through the mill renders said two preceding means ineffective and connects said indicators to said connection.

9. In a continuous rolling mill stand comprising a frame, rolls mounted in said frame and means for moving said rolls relatively to effect preloading or separation, the load between the rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, a connection between said indicators whereby equal increments of movement of the pressure indicator yield progressively smaller increments of movement of the thickness indicator, and means rendered effective when said roll-moving means is actuated to preload the rolls, when no material is passing through the mill, for actuating said connection and for disconnecting only said thickness indicator from said connection during the preloading operation.

10. In a continuous rolling mill stand comprising a frame, rolls mounted in said frame and means for moving said rolls relatively to effect preloading or separation, the load between the rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, a connection between said indicators whereby equal increments of movement of the pressure indicator yield progressively smaller increments of movement of the thickness indicator, means rendered effective when said roll-moving means is actuated to preload the rolls, when no material is passing through the mill, for actuating said connection and for disconnecting only said thickness indicator from said connection during the preloading operation, and means whereby the passage of material through the mill renders said preceding means ineffective and connects said thickness indicator to said connection.

11. In a continuous rolling mill stand comprising a frame, rolls mounted in said frame and means for moving said rolls relatively to effect preloading or separation, the load between the rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, a connection between said indicators whereby equal increments of movement of the pressure indicator yield progressively smaller increments of movement of the thickness indicator, and means rendered effective when said roll-moving means is actuated to separate the rolls, when no material is passing through the mill, for actuating said thickness indicator and for disconnecting only said thickness indicator from said connection during the roll-separating operation.

12. In a continuous rolling mill stand comprising a frame, rolls mounted in said frame and means for moving said rolls relatively to effect preloading or separation, the load between the rolls causing elongation of said frame, equal increments of load producing progressively smaller increments of stretch of said frame, a pressure indicator adapted to move through equal increments in response to equal increments of load, a thickness indicator for continuously indicating thickness of material passing through the rolls, a connection between said indicators whereby equal increments of movement of the pressure indicator yield progressively smaller increments of movement of the thickness indicator, means rendered effective when said roll-moving means is actuated to separate the rolls, when no material is passing through the mill, for actuating said thickness indicator and for disconnecting only said thickness indicator from said connection during the roll-separating operation, and means whereby the passage of material through the mill renders said preceding means ineffective and connects said thickness indicator to said connection.

ALEXANDER ZEITLIN.